United States Patent
Omori

(10) Patent No.: US 11,242,892 B2
(45) Date of Patent: Feb. 8, 2022

(54) RADIAL FOIL BEARING

(71) Applicant: IHI CORPORATION, Tokyo (JP)

(72) Inventor: Naomichi Omori, Tokyo (JP)

(73) Assignee: IHI CORPORATION, Tokyo (JP)

(*) Notice: Subject to any disclaimer, the term of this patent is extended or adjusted under 35 U.S.C. 154(b) by 0 days.

(21) Appl. No.: 16/727,063

(22) Filed: Dec. 26, 2019

(65) Prior Publication Data

US 2020/0224714 A1 Jul. 16, 2020

Related U.S. Application Data

(63) Continuation of application No. PCT/JP2018/024381, filed on Jun. 27, 2018.

(30) Foreign Application Priority Data

Jun. 27, 2017 (JP) .............................. JP2017-124796

(51) Int. Cl.
 *F16C 17/02* (2006.01)
 *F16C 35/02* (2006.01)
 *F16C 27/02* (2006.01)
 *F16C 43/02* (2006.01)

(52) U.S. Cl.
 CPC ............ *F16C 17/024* (2013.01); *F16C 35/02* (2013.01); *F16C 27/02* (2013.01); *F16C 43/02* (2013.01); *F16C 2226/74* (2013.01)

(58) Field of Classification Search
 CPC ......... F16C 17/024; F16C 27/02; F16C 43/02
 See application file for complete search history.

(56) References Cited

U.S. PATENT DOCUMENTS

| | | | |
|---|---|---|---|
| 3,366,427 A | 1/1968 | Marley et al. | |
| 4,415,280 A | 11/1983 | Agrawal | |
| 2002/0106138 A1 | 8/2002 | Akizuki et al. | |
| 2004/0179759 A1 | 9/2004 | Katou et al. | |
| 2010/0177997 A1* | 7/2010 | Lee | F16C 17/024 384/91 |
| 2011/0103725 A1 | 5/2011 | Omori | |
| 2011/0229065 A1 | 9/2011 | Flora et al. | |
| 2014/0147064 A1 | 5/2014 | Omori | |
| 2014/0241653 A1 | 8/2014 | Omori | |
| 2015/0030269 A1 | 1/2015 | Omori | |
| 2015/0159689 A1 | 6/2015 | Omori | |
| 2016/0010682 A1* | 1/2016 | Omori | F16C 27/02 384/103 |

(Continued)

FOREIGN PATENT DOCUMENTS

| | | |
|---|---|---|
| CN | 102192241 A | 9/2011 |
| CN | 103890423 A | 6/2014 |

(Continued)

*Primary Examiner* — James Pilkington

(57) ABSTRACT

A radial foil bearing includes: a bearing housing provided with an insertion hole; a top foil accommodated in the insertion hole; and a cover attached to an end surface of the bearing housing in an axial direction in which the insertion hole extends, wherein the top foil is rolled in a cylindrical shape in a state where two ends of the top foil intersect such that the two ends of the top foil are pulled out toward the bearing housing, and the cover faces, in the axial direction, at least either one of the two ends of the top foil, and an engagement member attached to the bearing housing and engaging with the top foil.

10 Claims, 13 Drawing Sheets

(56) References Cited

U.S. PATENT DOCUMENTS

2016/0312655 A1    10/2016   Yoshino et al.

FOREIGN PATENT DOCUMENTS

| CN | 104204566 A | 12/2014 |
| CN | 103717927 B | 9/2015 |
| CN | 104520598 B | 12/2016 |
| DE | 32 41 565 C2 | 10/1992 |
| EP | 2 835 543 A1 | 2/2015 |
| EP | 2 886 888 A1 | 6/2015 |
| JP | 2003-056561 A | 2/2003 |
| JP | 2004-011839 A | 1/2004 |
| JP | 2004-270904 A | 9/2004 |
| JP | 2006-057652 A | 3/2006 |
| JP | 2006-057828 A | 3/2006 |
| JP | 2009-299748 A | 12/2009 |
| JP | 2010-529390 A | 8/2010 |
| JP | 2010-215980 A | 9/2010 |
| JP | 2013-217425 A | 10/2013 |
| JP | 2014-037857 A | 2/2014 |
| JP | 2015-143572 A | 8/2015 |
| KR | 10-1534639 B1 | 7/2015 |
| WO | 2015/087675 A1 | 6/2015 |

* cited by examiner (a)

(b)

(c)

RADIAL FOIL BEARING

CROSS-REFERENCE TO RELATED APPLICATIONS

This application is a Continuation application based on International Application No. PCT/JP2018/024381, filed Jun. 27, 2018, which claims priority on Japanese Patent Application No. 2017-124796, filed Jun. 27, 2017, the contents of which are incorporated herein by reference.

TECHNICAL FIELD

The present disclosure relates to a radial foil bearing.

BACKGROUND

Conventionally, as a bearing for a high-speed rotating body, a radial foil bearing to be used encircling a rotary shaft is known. As such a radial foil bearing, a configuration is well known including a thin sheet-shaped top foil that forms a bearing surface, a back foil that elastically supports the top foil, and a cylindrical housing that accommodates the top foil and the back foil. As the back foil of the radial foil bearing, for example, a bump foil obtained by forming a thin sheet into wave-sheet shape is used.

In such a radial foil bearing, in order to prevent the top foil from detaching from the bearing housing, in Patent Document 1 described below, a through groove is provided in the inner peripheral surface of the bearing housing, and a fixing tool is fitted into the through groove to form a plurality of engagement grooves. The top foil has a configuration in which a metal foil having a first uneven portion and a second uneven portion at two end portions thereof is rolled in a cylindrical shape. Protruding parts (two ends) at the two end portions of the top foil pulled out toward the bearing housing engage with the plurality of engagement grooves to prevent the top foil from detaching from the bearing housing.

Patent Documents 2 to 4 described below also disclose radial foil bearings.

DOCUMENT OF RELATED ART

Patent Document

[Patent Document 1] Japanese Unexamined Patent Application, First Publication No. 2013-217425
[Patent Document 2] Japanese Unexamined Patent Application, First Publication No. 2014-37857
[Patent Document 3] Published Japanese Translation No. 2010-529390 of the PCT International Publication No. WO 2008/153226
[Patent Document 4] Japanese Unexamined Patent Application, First Publication No. 2010-215980

SUMMARY

Technical Problem

Incidentally, in the above related art, in order to attach the top foil into the bearing housing, two ends of the top foil have to be engaged with the engagement grooves of the fixing tool fitted to the bearing housing in a state where the two ends intersect. In order to perform this, it is needed to roll the top foil into a conical shape so as to be smaller than the inner diameter of an insertion hole of the bearing housing, and then to insert it into the insertion hole of the bearing housing in the axial direction. In this way, conventionally, in order to attach the top foil into the bearing housing, the skill and period of time of the operator are needed.

The present disclosure was made in view of the above problems, and an object thereof is to improve the workability in attaching the top foil into the bearing housing.

Solution to Problem

In order to solve the above problems, a radial foil bearing of an aspect of the present disclosure includes: a bearing housing provided with an insertion hole; a top foil accommodated in the insertion hole; and a cover attached to an end surface of the bearing housing in an axial direction in which the insertion hole extends, wherein the top foil is rolled in a cylindrical shape in a state where two ends of the top foil intersect such that the two ends of the top foil are pulled out toward the bearing housing, and the cover faces, in the axial direction, at least either one of the two ends of the top foil, and an engagement member attached to the bearing housing and engaging with the top foil.

In the radial foil bearing of the above aspect of the present disclosure, the insertion hole may be provided with a through groove extending from the end surface of the bearing housing in the axial direction, the two ends of the top foil may be accommodated in the through groove, and the cover may cover at least part of an open end of the through groove formed on the end surface of the bearing housing.

In the radial foil bearing of the above aspect of the present disclosure, the engagement member may be accommodated in the through groove.

In the radial foil bearing of the above aspect of the present disclosure, a surface of the engagement member facing a bottom surface of the through groove may be flat.

In the radial foil bearing of the above aspect of the present disclosure, the engagement member may have a chamfer or fillet facing a corner between a side surface and a bottom surface of the through groove.

In the radial foil bearing of the above aspect of the present disclosure, the corner of the through groove may have a curved surface that smoothly connects the side surface and the bottom surface.

In the radial foil bearing of the above aspect of the present disclosure, the cover may be attached to the bearing housing by caulking.

In the radial foil bearing of the above aspect of the present disclosure, the cover includes: an annular portion facing the end surface of the bearing housing, and a caulking part extending from an outer edge of the annular portion and facing an outer peripheral surface of the bearing housing positioned on outside in a radial direction of the insertion hole.

Effects

According to the present disclosure, the workability in attaching the top foil into the bearing housing can be improved.

DESCRIPTION OF EMBODIMENTS

Hereinafter, radial foil bearings of the present disclosure will be described in detail with reference to the drawings.

Figure 1:
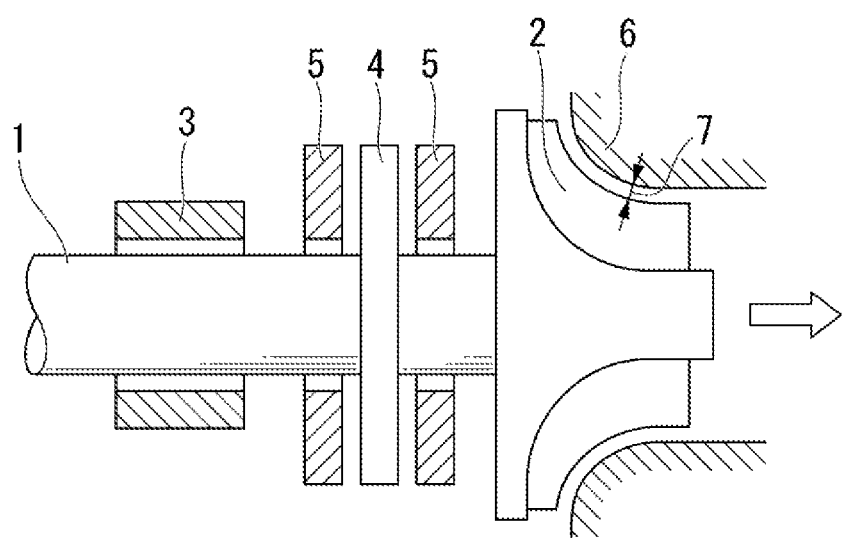
FIG. 1 is a side view showing an example of a turbo machine to which a radial foil bearing of the present disclosure is applied.

FIG. 1 is a side view showing an example of a turbo machine to which a radial foil bearing of the present disclosure is applied.

In FIG. 1, the reference sign 1 represents a rotary shaft, the reference sign 2 represents an impeller provided at the end on one side in the axial direction of the rotary shaft, and the reference sign 3 represents a radial foil bearing of the present disclosure. Note that FIG. 1 shows only one radial foil bearing by omission, but two radial foil bearings are usually provided in the axial direction of the rotary shaft 1. Therefore, two radial foil bearings 3 are also provided in the present disclosure.

The radial foil bearing 3 is provided on the rotary shaft 1 so as to encircle the rotary shaft 1. That is, the rotary shaft 1 is inserted through the radial foil bearing 3. A thrust collar 4 is provided between the impeller 2 and the radial foil bearing 3 of the rotary shaft 1. A thrust bearing 5 is disposed (inserted) on each of both sides in the axial direction of the thrust collar 4. The impeller 2 is disposed inside a housing 6 that is the stationary side, and a tip clearance 7 is provided between the impeller 2 and the housing 6.

Figure 2:
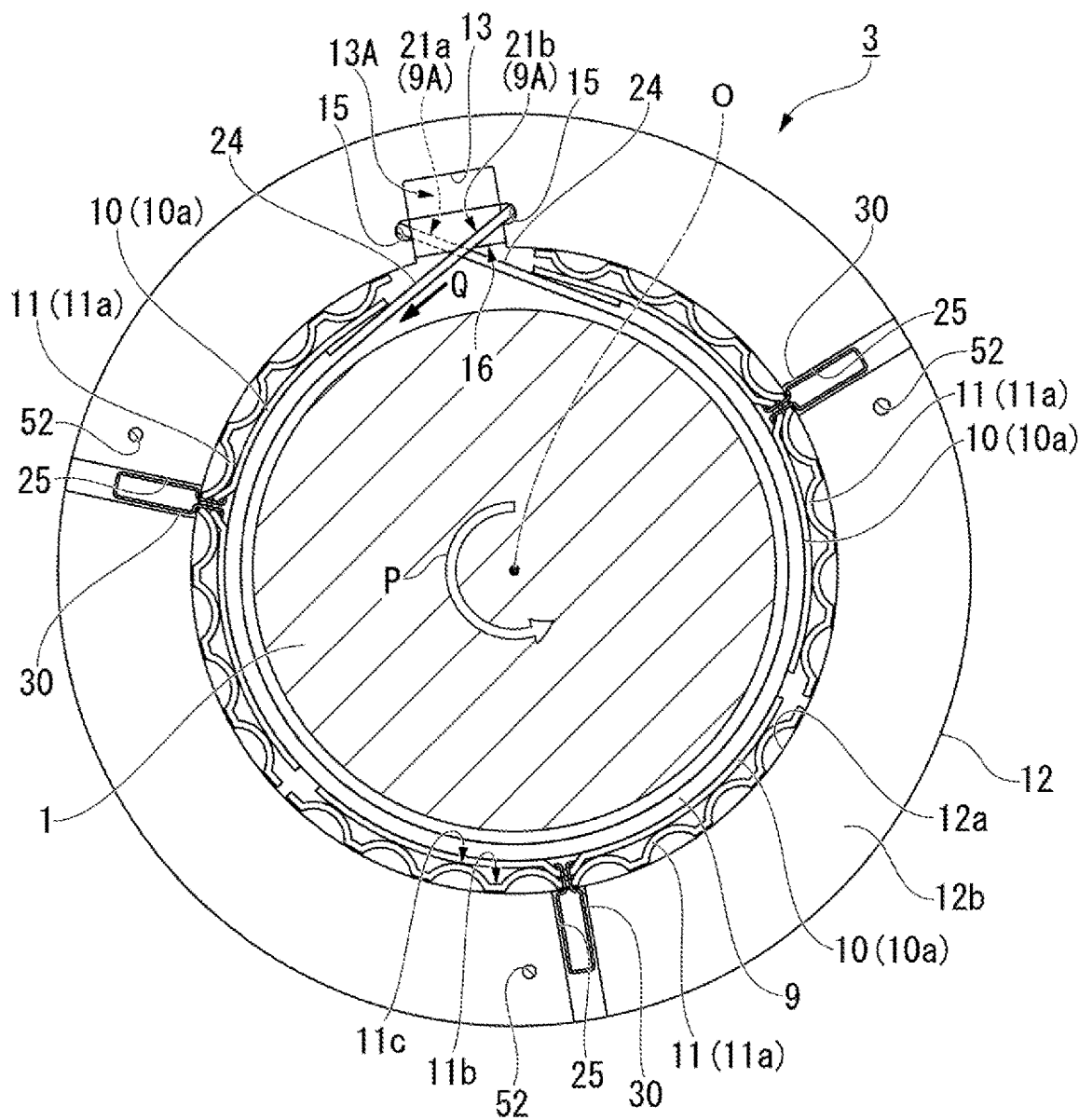
FIG. 2 is a front view showing the radial foil bearing of the present disclosure.
Figure 3:
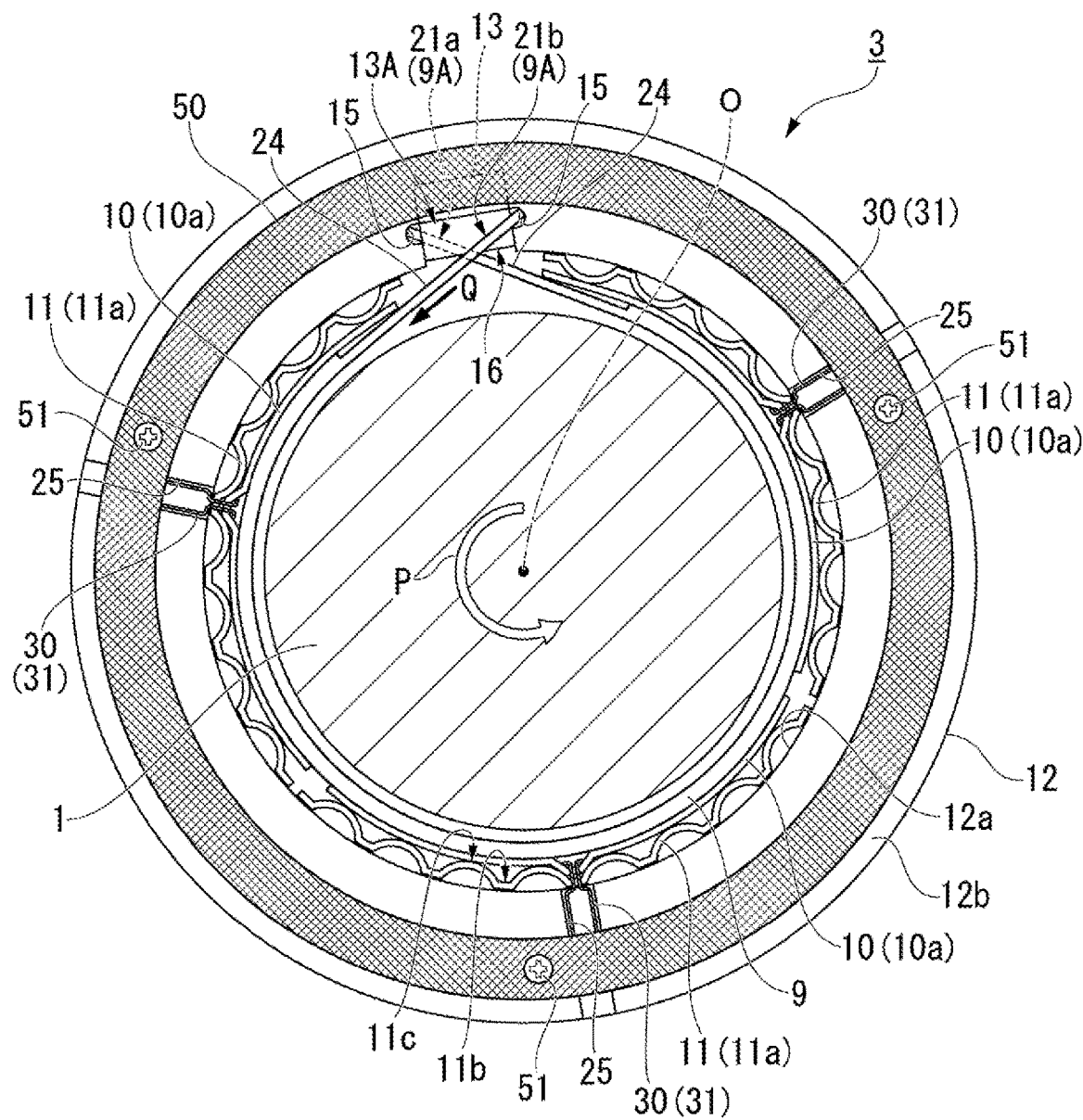
FIG. 3 is a front view showing a state where the radial foil bearing of the present disclosure is attached with a cover.

FIG. 2 is a front view showing the radial foil bearing 3 of the present disclosure. FIG. 3 is a front view showing a state where the radial foil bearing 3 of the present disclosure is attached with a cover 50.

The radial foil bearing 3 is a bearing that is provided encircling the rotary shaft 1 and that supports the rotary shaft 1. The radial foil bearing 3 includes a top foil 9, an intermediate foil 10, a back foil 11 and a bearing housing 12. The bearing housing 12 is provided with an insertion hole 12a through which the rotary shaft 1 is inserted. Note that the bearing housing 12 provided with the insertion hole 12a of the present disclosure has a cylindrical shape.

In the following description, the positional relationships between members may be described based on the insertion hole 12a. Specifically, the "axial direction" refers to the direction in which the insertion hole 12a extends (the direction in which the rotary shaft 1 is inserted). A "radial direction" refers to the radial direction of the insertion hole 12a (namely, a direction orthogonal to an central axis (see the reference sign O in FIGS. 2, 3 and 10) of the insertion hole 12a). A "circumferential direction" refers to the circumferential direction along the inner peripheral surface of the insertion hole 12a (namely, the direction around the central axis of the insertion hole 12a).

The bearing housing 12 is a cylindrical member that configures the outermost part in the radial direction of the radial foil bearing 3. The back foil 11, the intermediate foil 10 and the top foil 9 are accommodated in the insertion hole 12a of the bearing housing 12. Specifically, the back foil 11 is supported by the inner peripheral surface of the insertion hole 12a, the intermediate foil 10 is supported by the back foil 11, and the top foil 9 is supported by the intermediate foil 10. Note that the bearing housing 12 of the present disclosure is a cylindrical member including the insertion hole 12a. However, the bearing housing 12 may be a member other than a cylinder (for example, a square pillar) as long as the bearing housing 12 is provided with the insertion hole 12a.

The back foil 11 is disposed on the inner peripheral surface of the insertion hole 12a of the bearing housing 12. The back foil 11 is a foil (thin sheet) that elastically supports the intermediate foil 10 and the top foil 9. For the back foil 11, for example, a bump foil, a spring foil disclosed in Japanese Unexamined Patent Application, First Publication No. 2006-57652, Japanese Unexamined Patent Application, First Publication No. 2004-270904 or the like, or a back foil disclosed in Japanese Unexamined Patent Application, First Publication No. 2009-299748 or the like is used. In the present disclosure, a bump foil is used for the back foil 11.

The back foil 11 of the present disclosure is configured of three (a plurality of) back foil pieces 11a disposed along the inner peripheral surface of the insertion hole 12a. The back foil piece 11a is that a foil (thin sheet) is formed in a wave-sheet shape in the circumferential direction. The three back foil pieces 11a are curved so as to be substantially cylindrical as a whole when viewed in the axial direction. That is, the back foil pieces 11a are supported by the inner peripheral surface of the insertion hole 12a. In the present disclosure, all of the three back foil pieces 11a are formed in equal shape and dimensions. Thus, the back foil pieces 11a are arranged so as to divide the inner peripheral surface of the insertion hole 12a into substantially three in the circumferential direction.

In the back foil piece 11a, hill parts 11c protruding inward in the radial direction and valley parts 11b protruding outward in the radial direction when viewed from the hill parts 11c are alternately formed in the circumferential direction. The valley part 11b includes a flat part facing the bearing housing 12, and the flat part can contact the inner peripheral surface of the insertion hole 12a. The hill part 11c can contact the intermediate foil 10 (an intermediate foil piece 10a). In this way, the back foil piece 11a elastically supports the top foil 9 by the hill parts 11c via the intermediate foil piece 10a. Two ends of the back foil piece 11a in the circumferential direction are each formed to be the valley part 11b.

The intermediate foil 10 is disposed between the top foil 9 and the back foil 11. The intermediate foil 10 of the present disclosure is configured of three intermediate foil pieces 10a disposed along the inner peripheral surface of the insertion hole 12a. The intermediate foil piece 10a is formed such that the developed shape thereof is a substantially rectangular shape. The three intermediate foil pieces 10a are curved so as to be a substantially cylindrical shape as a whole when viewed in the axial direction. In the present disclosure, all of the three intermediate foil pieces 10a are formed in equal shape and dimensions. Therefore, the intermediate foil pieces 10a are disposed so as to divide the inner peripheral surface of the insertion hole 12a into substantially three in the circumferential direction. Note that the intermediate foil piece 10a of the present disclosure is apart from an adjacent intermediate foil piece 10a at a position in the circumferential direction between the peaks of the hill parts 11c adjacent to each other in the circumferential direction, and the separation between the back foil pieces 11a adjacent to each other in the circumferential direction is interposed between the hill parts 11c. That is, the intermediate foil pieces 10a are not apart from each other at a position facing the peak of the hill part 11c of the back foil piece 11a.

A plurality of first engagement grooves 25 extending outward in the radial direction from the inner peripheral edge (inner peripheral surface) of the insertion hole 12a are provided on both end surfaces 12b of the bearing housing 12 in the axial direction. That is, the end surface 12b of the bearing housing 12 is provided with recesses extending to the inner peripheral surface of the bearing housing 12. The first engagement groove 25 of the present disclosure is formed at each of positions that divide the end surface 12b of the bearing housing 12 into substantially three in the circumferential direction. The first engagement groove 25 is engaged with an engagement pin 30 for attaching the back foil 11 and the intermediate foil 10 to the bearing housing 12.

The first engagement groove 25 of this embodiment is formed from the inner peripheral edge (inner peripheral surface) of the insertion hole 12a to the outer peripheral edge (outer peripheral surface) of the bearing housing 12, but the present disclosure is not limited thereto. For example, the first engagement groove may be formed from the inner peripheral edge (inner peripheral surface) of the insertion hole 12a to an intermediate position in the thickness direction (the radial direction) of a plate member configuring the bearing housing 12. That is, the first engagement groove may not reach the outer peripheral edge of the bearing housing 12.

Figure 4:
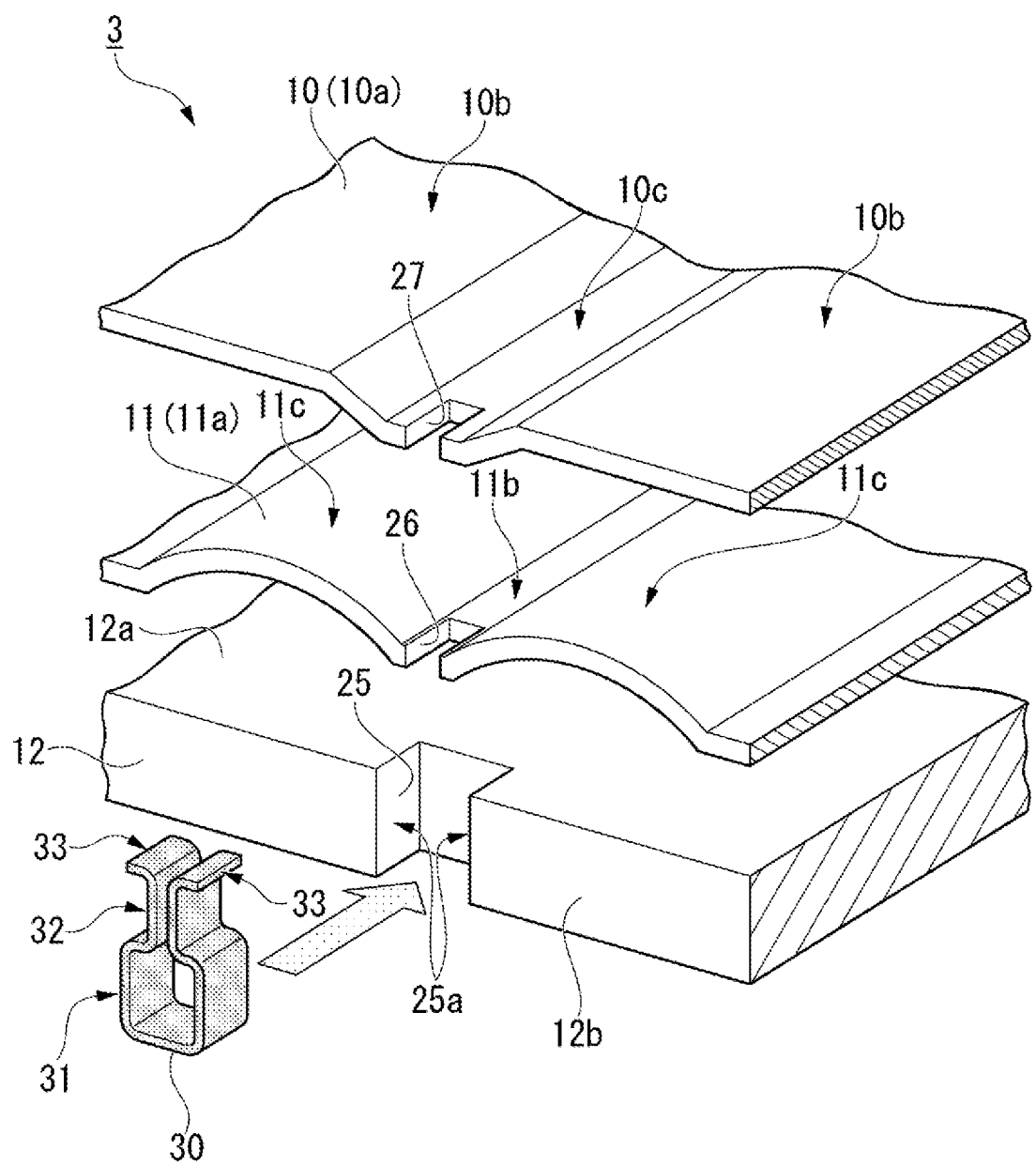
FIG. 4 is a perspective view showing an attachment structure of a back foil and an intermediate foil of the present disclosure to a bearing housing.
Figure 5:
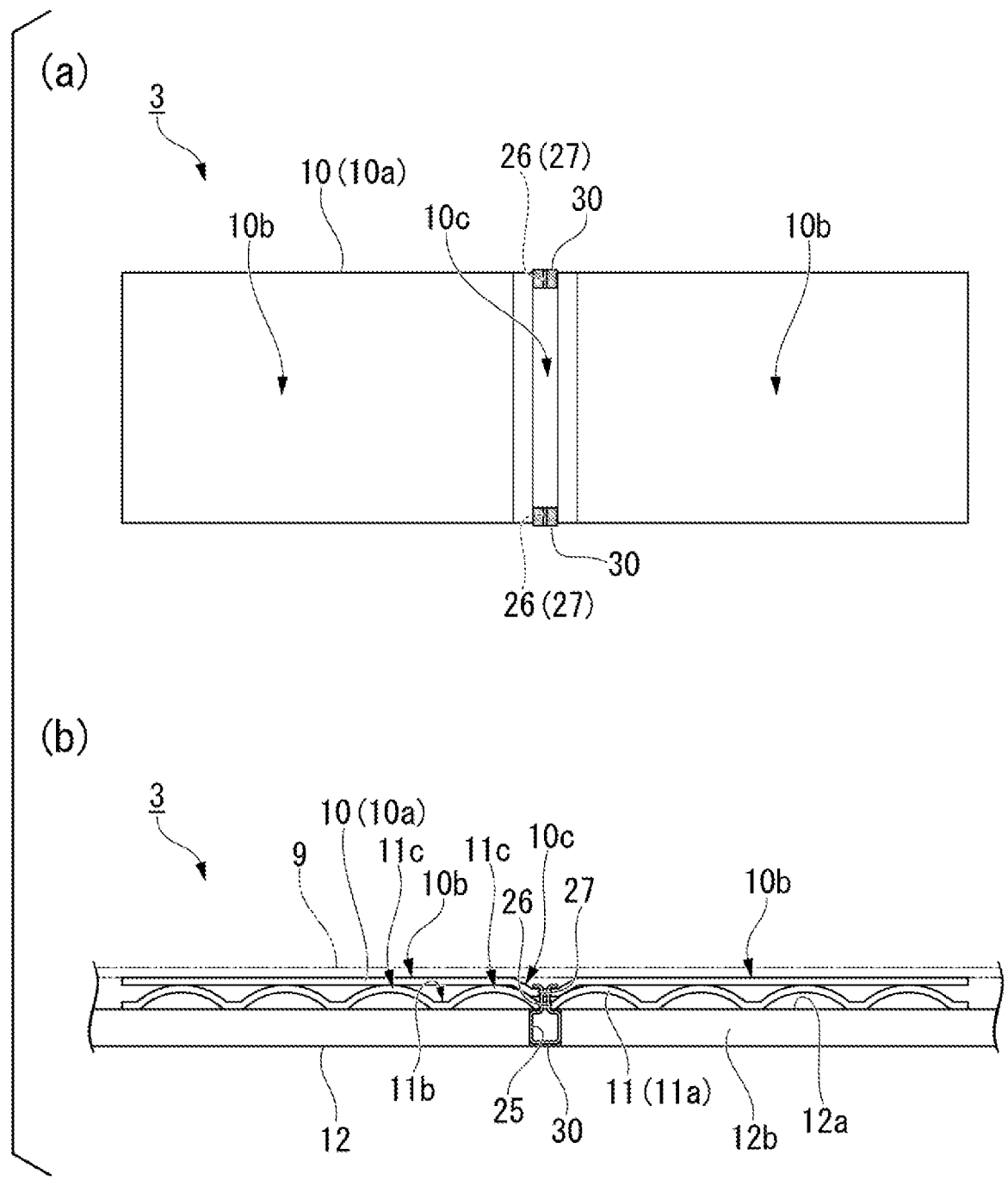
FIG. 5 is a schematic view in which the attachment structure of the back foil and the intermediate foil of the present disclosure to the bearing housing is flattened, the part (a) thereof is a plan view, and the part (b) thereof is a front view.

FIG. 4 is a perspective view showing an attachment structure of the back foil 11 and the intermediate foil 10 of the present disclosure to the bearing housing 12. FIG. 5 is a schematic view in which the attachment structure of the back foil 11 and the intermediate foil 10 of the present disclosure to the bearing housing 12 is flattened, the part (a) thereof is a plan view, and the part (b) thereof is a front view.

As shown in FIG. 4 and the part (a) of FIG. 5, the back foil piece 11a includes notches 26 at edges of two ends thereof in the axial direction. These notches 26 are provided in the valley part 11b of the back foil piece 11a.

The notch 26 is formed at a position in the circumferential direction between two ends of the back foil piece 11a in the circumferential direction (in the present disclosure, at a center position of the back foil piece 11a in the circumferential direction). That is, the edges of two ends in the axial direction of the back foil piece 11a are each provided with a depression in the axial direction at the above position in the circumferential direction. As shown in FIG. 4, the notch 26 is disposed at a position corresponding to the first engagement groove 25 of the bearing housing 12, namely, at a position overlapping the first engagement groove 25. In other words, the notch 26 is disposed at an equivalent position to the first engagement groove 25 in the axial direction and the circumferential direction. The width of the notch 26 (the width in the circumferential direction) is formed to be less than the width of the first engagement groove 25 (the width in the circumferential direction). That is, two ends in the circumferential direction of the notch 26 are positioned at positions in the circumferential direction between two ends in the circumferential direction of the first engagement groove 25.

As shown in the part (a) of FIG. 5, the external shape of the intermediate foil piece 10a has a size substantially equal to the external shape of the back foil piece 11a. As shown in the part (b) of FIG. 5, the intermediate foil piece 10a includes flat portions 10b contacting the peaks of the hill parts 11c of the back foil 11, and a recess 10c recessed (protruding) outward in the radial direction relative to the flat portions 10b. That is, the recess 10c is apart from the top foil 9. As shown in the part (a) of FIG. 5, the recess 10c is formed at a position in the circumferential direction between two ends in the circumferential direction of the intermediate foil piece 10a (in the present disclosure, at a center position of the intermediate foil piece 10a in the circumferential direction).

The recess 10c of the present disclosure includes a bottom portion positioned outward in the radial direction relative to the flat portions 10b and being flat in the circumferential direction, and tapered portions positioned at both ends in the circumferential direction of the bottom portion and extending inward in the radial direction toward the flat portions 10b. The separation between the pair of tapered portions increases inward from outside in the radial direction. As shown in FIG. 4, the width in the circumferential direction of the bottom portion of the recess 10c is greater than the width in the circumferential direction of the flat part of the valley part 11b of the back foil piece 11a. Note that in a case where both of the hill part 11c and the valley part 11b are formed in cycles so as to each have one peak, the width in the circumferential direction of the valley part 11b of the present disclosure is the less one of the length in the circumferential direction of the hill part 11c and the length in the circumferential direction of the valley part 11b of the back foil piece 11a at an intermediate position in the radial direction between the peak of the hill part 11c and the peak of the valley part 11b.

As shown in FIG. 4, the intermediate foil piece 10a is provided with notches 27 (second notches) at the edges of two ends thereof in the axial direction. The notches 27 are provided in the recess 10c of the intermediate foil piece 10a. The notch 27 is formed at a position in the circumferential direction between two ends of the intermediate foil piece 10a in the circumferential direction (in the present disclosure, at a center position of the intermediate foil piece 10a in the circumferential direction). That is, the edges of two ends in the axial direction of the intermediate foil piece 10a are each provided with a depression in the axial direction at the above position in the circumferential direction.

The notch 27 of the present disclosure is formed by cutting out part of the bottom portion of the recess 10c formed between the flat portions 10b, toward the center of the intermediate foil piece 10a in the axial direction. The notch 27 is formed at a position corresponding to the first engagement groove 25 of the bearing housing 12 and the notch 26 of the back foil piece 11a, namely, at a position overlapping the first engagement groove 25 and the notch 26 in the circumferential direction. In other words, the notch 27 is disposed at an equivalent position to the first engagement groove 25 and the notch 26 in the axial direction and the circumferential direction. The width of the notch 27 (the width in the circumferential direction) is formed to be less than the width of the first engagement groove 25 (the width in the circumferential direction) and to be equal to the width of the notch 26 (the width in the circumferential direction).

As shown in FIG. 4, the engagement pin 30 is attached to the first engagement groove 25 of the bearing housing 12. The engagement pin 30 passes through the notch 26 and the notch 27 and extends to the outside of the formation area of the notch 27 in the circumferential direction on a front side (the inner side in the radial direction) of the intermediate foil 10 (the intermediate foil piece 10a). The engagement pin 30 includes an engagement part 31 engaging in the first engagement groove 25 of the bearing housing 12, insertion parts 32 inserted through (or fitted into) the notch 26 and the notch 27, and return parts 33 facing the front side of the intermediate foil 10 (the back foil 11).

The engagement part 31 contacts inner surfaces 25a at two ends in the circumferential direction of the first engagement groove 25. The inner surfaces 25a of the first engagement groove 25 face each other with a space in the circumferential direction and extend to be parallel to the radial direction. The engagement part 31 is formed in a rectangular frame shape that contacts the inner surfaces 25a of the first engagement groove 25 with a predetermined width in the radial direction. An area forming a space in the circumferential direction is provided between a portion on one side in the circumferential direction of the engagement part 31 facing one inner surface 25a and a portion on the other side in the circumferential direction of the engagement part 31 facing another inner surface 25a. The engagement part 31 is smoothly separated from the inner surface 25a by providing an R (curved shape) or the like. That is, the corner of the rectangular frame of the engagement part 31 has a curved shape.

The insertion parts 32 extend from the upper part of the rectangular frame-shaped engagement part 31 inward in the radial direction in parallel. Two insertion parts 32 are provided extending from the engagement part 31 and are apart from each other. The insertion part 32 and the engagement part 31 are smoothly connected by providing an R (curved shape) or the like. The insertion part 32 contacts the intermediate foil piece 10a or the back foil piece 11a in the axial direction.

The return parts 33 are formed by being bent in directions away from each other in the circumferential direction from the distal ends of the insertion parts 32 extending in parallel inward in the radial direction. That is, the engagement pin 30 includes a pair of return parts 33 that extend in directions away from each other in the circumferential direction. The pair of the return parts 33 are accommodated in the recess 10c of the intermediate foil 10, and as shown in the part (b) of FIG. 5, the pair of the return parts 33 are positioned outward in the radial direction relative to the opening position (the upper end, the inner end in the radial direction) of the recess 10c.

The engagement pin 30 contacts the inner surfaces 25a of the first engagement groove 25 in an accumulated state. The engagement pin 30 of the present disclosure is formed by bending one leaf spring (elastic member) into a substantially C-shape (bottle shape). The engagement part 31 of the engagement pin 30 engages in the first engagement groove 25 in a state of slightly compressed in the circumferential direction. Thereby, a spring-back that opens the engagement part 31 in the circumferential direction acts on the engagement part 31. Therefore, a frictional force occurs between the engagement part 31 and the inner surface 25a of the first engagement groove 25, and the engagement pin 30 is held in the bearing housing 12. Note that the "accumulated state" in the present disclosure refers to an elastically compressed state.

Figure 6:
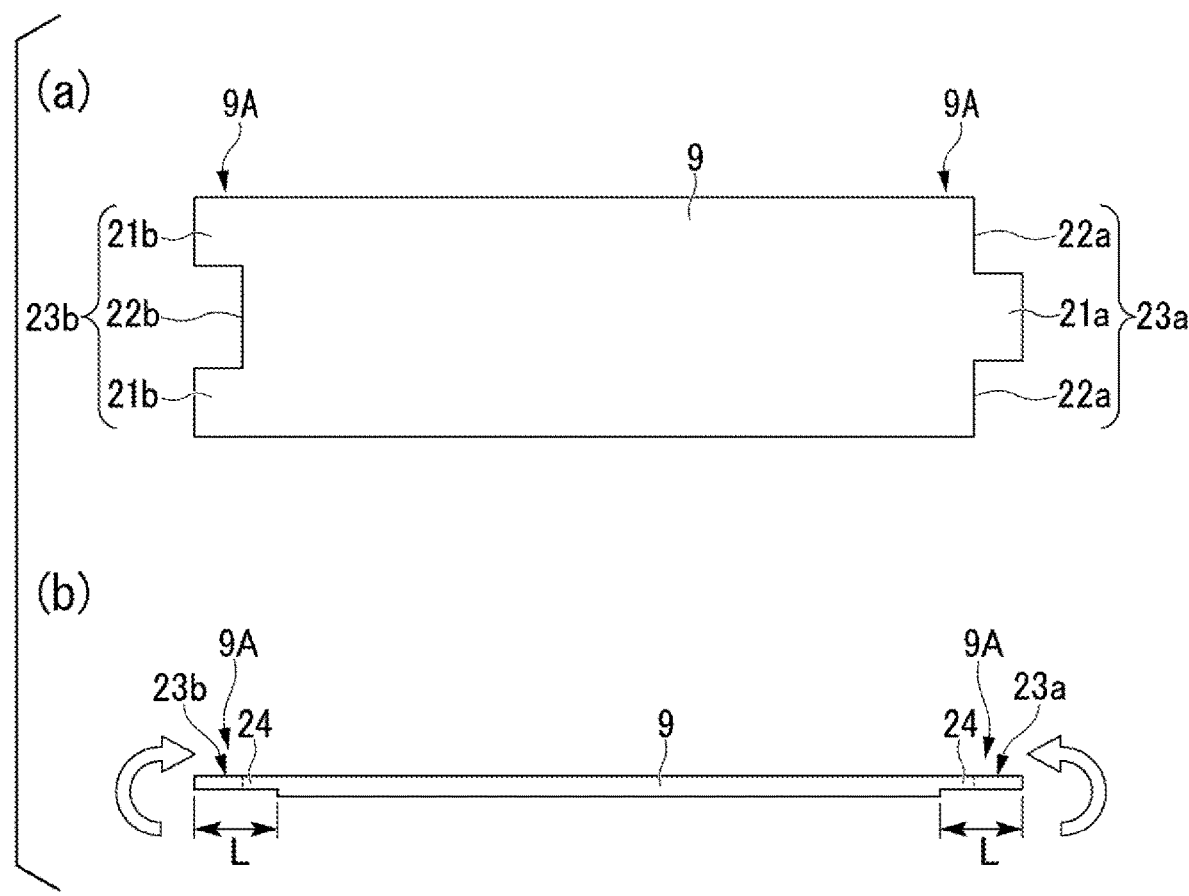
FIG. 6 is a schematic view in which a top foil of the present disclosure is developed, the part (a) thereof is a plan view, and the part (b) thereof is a front view.

FIG. 6 is a schematic view in which the top foil 9 of the present disclosure is developed, the part (a) thereof is a plan view, and the part (b) thereof is a front view.

As shown in the part (a) of FIG. 6, the top foil 9 is a substantially rectangular metal foil having long sides that are in the circumferential direction and short sides that are in the axial direction. As shown in FIG. 2, the top foil 9 is rolled in a cylindrical shape in a state where two end portions 9A thereof in the circumferential direction intersect each other. The top foil 9 is disposed facing the outer peripheral surface of the rotary shaft 1.

As shown in the part (a) of FIG. 6, one short side in the long-side direction among the two end portions 9A of the top foil 9 is provided with a first uneven portion 23a that includes one protruding part 21a protruding to one side in the long-side direction, and two recessed parts 22a formed on both sides in the short-side direction of the protruding part 21a. That is, one short side in the long-side direction of the top foil 9 includes one protruding part 21a protruding in the long-side direction and steps extending to both sides in the short-side direction of the protruding part 21a.

The other short side (the short side positioned on the other side in the long-side direction) on the opposite side from the one short side among the two end portions 9A of the top foil 9 is provided with a second uneven portion 23b that includes two protruding parts 21b apart from each other in the short-side direction, and one recessed part 22b positioned between the two protruding parts 21b. In other words, the short side positioned on the other side in the long-side direction of the top foil 9 includes the recessed part 22b depressed toward the one side in the long-side direction, and steps positioned on both sides in the short-side direction of the recessed part 22b.

The recessed part 22b of the second uneven portion 23b is formed corresponding to the protruding part 21a of the first uneven portion 23a. The recessed parts 22a of the first uneven portion 23a are formed corresponding to the protruding parts 21b of the second uneven portion 23b. That is, the minimum value of the space in the short-side direction of the recessed part 22b is greater than the maximum value of the width in the short-side direction of the protruding part 21a. The length (depression depth) in the long-side direction of the recessed part 22b of the present disclosure and the length in the long-side direction of the protruding part 21a are constant in the long-side direction.

The recessed part 22b of the second uneven portion 23b is formed such that the protruding part 21a passes through the recessed part 22b when the top foil 9 is rolled into a cylindrical shape such that the first uneven portion 23a and the second uneven portion 23b overlap each other. Similarly, the recessed parts 22a of the first uneven portion 23a are formed such that the protruding parts 21b pass through the recessed parts 22a when the top foil 9 is rolled into a cylindrical shape.

As shown in FIG. 2, the protruding parts 21a and 21b passed through the recessed parts 22b and 22a, respectively, are pulled out toward the bearing housing 12. In this way, the top foil 9 is rolled in a cylindrical shape in a state where the protruding parts 21a and 21b (two ends) intersect such that the protruding parts 21a and 21b are pulled out (extend) toward the bearing housing 12 (outward in the radial direction). That is, when the top foil 9 disposed on the inner peripheral side of the insertion hole 12a is viewed in the axial direction, the protruding part 21a and the protruding part 21b intersect each other. The protruding part 21a of the top foil 9 is positioned between the two protruding parts 21b in the axial direction. In the bearing housing 12, the inner peripheral surface of the insertion hole 12a is provided with a through groove 13 that is continuous from one end surface 12b to the other end surface 12b in the axial direction. In the present disclosure, the through groove 13 is disposed between two pairs of first engagement grooves 25 among three pairs of first engagement grooves 25. A pair of first engagement grooves 25 face the through groove 13 in the radial direction.

Figure 7:
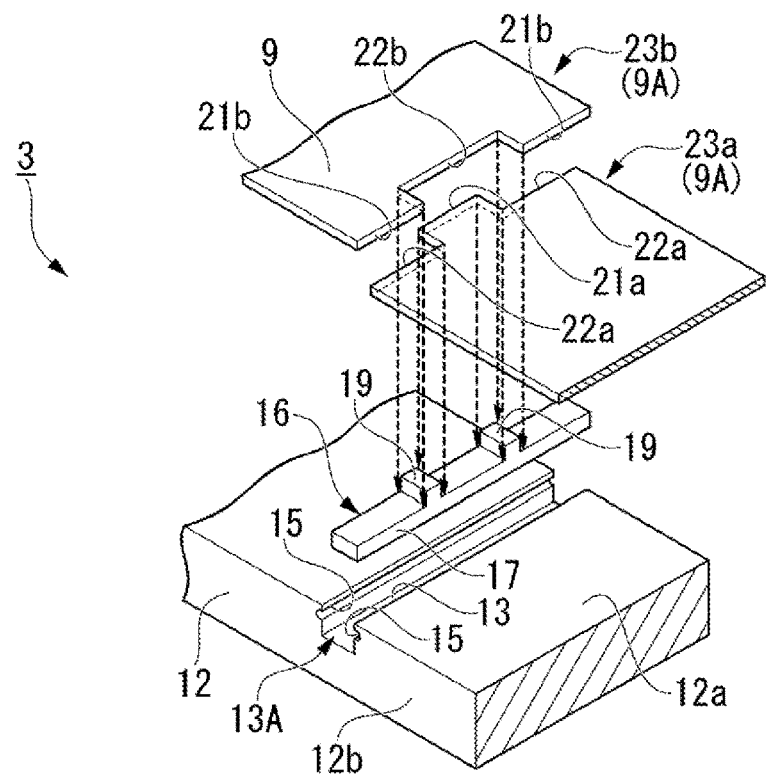
FIG. 7 is a schematic view of the main part of a through groove of the bearing housing of the present disclosure, the part (a) thereof is an exploded perspective view, the part (b) thereof is a plan view, and the part (c) thereof is a cross-sectional view taken along line A-A.
Figure 7:
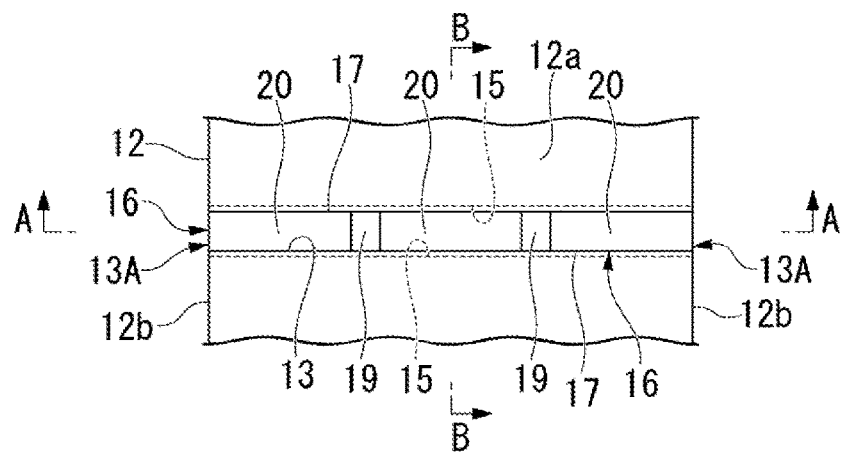
Figure 7:
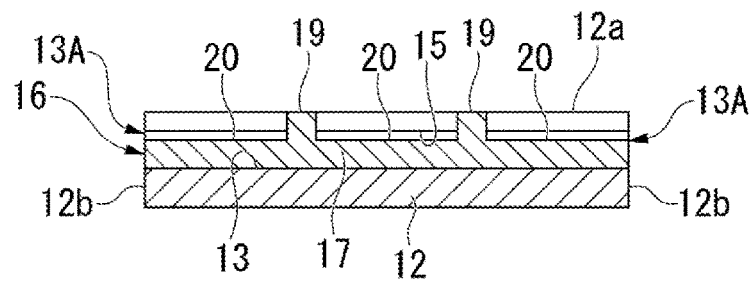
Figure 8A:
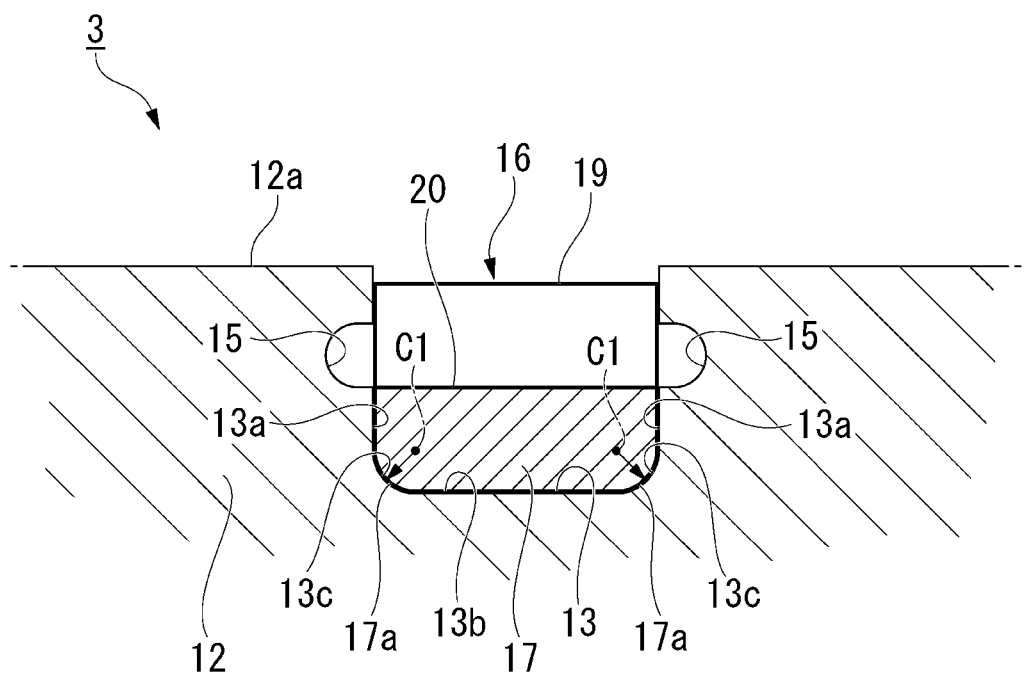
FIG. 8A is a cross-sectional view taken along line B-B in FIG. 7.

FIG. 7 is a schematic view of the main part of the through groove 13 of the bearing housing 12 of the present disclosure, the part (a) thereof is an exploded perspective view, the part (b) thereof is a plan view, and the part (c) thereof is a cross-sectional view taken along line A-A. FIG. 8A is a cross-sectional view taken along line B-B in FIG. 7.

As shown in the parts (a) and (b) of FIG. 7, side surfaces of the through groove 13 face each other in the circumferential direction are each provided with a recess 15. The recesses 15 are formed on the entire length of the through groove 13. The cross-sectional shape of the recess 15 has a U-shape (semi-circular arc shape). The recess 15 is formed at the opening end in the radial direction of the through groove 13, namely, at a position deeper than (outward in the radial direction relative to) the inner peripheral surface (the insertion hole 12a) of the bearing housing 12. As shown in FIG. 2, the protruding parts 21a and 21b passed through the recessed parts 22b and 22a are inserted into the recesses 15.

As shown in the part (a) of FIG. 7, an engagement member 16 is fitted into the through groove 13. The engagement member 16 is attached to the bearing housing 12 and engages with the top foil 9. As shown in the parts (a) to (c) of FIG. 7, the engagement member 16 includes a bar-shaped (square pillar-shaped) base 17 accommodated in the through groove 13, and two partition parts 19 provided in the base 17. The partition parts 19 protrude from the base 17 toward the inner peripheral side (inward in the radial direction). The base 17 is accommodated in the through groove 13 on the entire length of the through groove 13. The base 17 is accommodated in the through groove 13 in a state where the upper surface (the surface on the partition part 19-side) of the base 17 is positioned slightly below the opening of the through groove 13 (where the upper surface is positioned outward in the radial direction). That is, in the radial foil bearing 3, a step positioned outward in the radial direction when viewed from the inner peripheral surface of the bearing housing 12 is provided between the inner peripheral surface of the bearing housing 12 (the insertion hole 12a) and the surface of the base 17 facing the inner peripheral side. A step positioned inward in the radial direction when viewed from the inner peripheral surface of the bearing housing 12 may be provided between the inner peripheral surface of the bearing housing 12 and the surface of the partition part 19 facing the inner peripheral side.

Figure 8B:
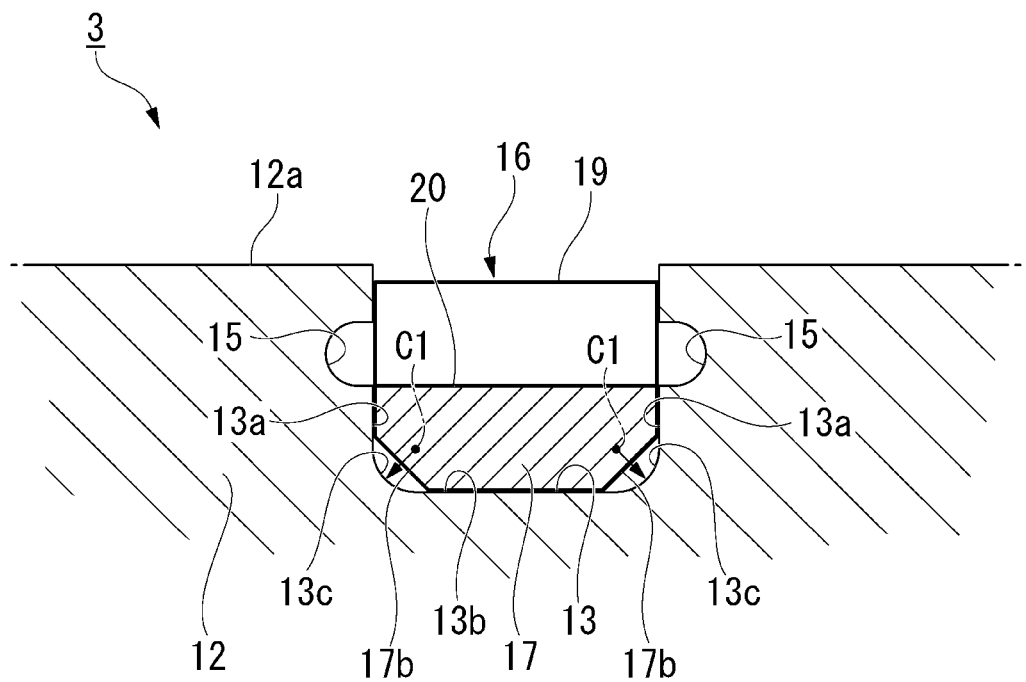
FIG. 8B is a diagram showing a modification of FIG. 8A.

A corner 13c that is a connection portion between a side surface 13a and a bottom surface 13b of the through groove 13 of the present disclosure has a curved surface that smoothly connects the side surface 13a and the bottom surface 13b. The surface of the engagement member 16 (the surface on the outer side in the radial direction of the base 17) facing the bottom surface 14b of the through groove 13 is flat. As shown in FIG. 8A, the base 17 has a fillet 17a facing the corner 13c between the side surface 13a and the bottom surface 13b of the through groove 13, and the bottom surface 13b and the base 17 can contact each other. That is, the center of curvature Cl of the curved surface of the corner 13c is positioned in the inner space of the through groove 13. The fillet 17a is configured by rounding the corner of the base 17 having a square pillar shape in cross-sectional view. The radius of curvature of the fillet 17a may be greater than or equal to the radius of curvature of the corner 13c. The fillet 17a may be replaced with a chamfer 17b formed of an inclined surface obtained by slantingly removing a corner from the base 17 having a square pillar shape in cross-sectional view (refer to FIG. 8B).

As shown in the parts (b) and (c) of FIG. 7, the partition part 19 is provided at each of two positions that divide the base 17 into substantially three equal portions in the axial direction. As shown in the part (c) of FIG. 7, the partition part 19 has the same height as the opening position of the through groove 13 or has a height such that the partition part 19 protrudes slightly inward in the radial direction from the opening position of the through groove 13. The partition parts 19 divide the upper surface of the base 17 into substantially three equal portions to form three second engagement grooves 20 in the axial direction.

The protruding parts 21a and 21b passed through the recessed parts 22b and 22a engage in the three second engagement grooves 20. As shown in FIG. 2, the distal ends thereof are inserted into the recesses 15. The protruding parts 21a and 21b are inserted into the recesses 15, whereby the movement (rotation) of the top foil 9 in the circumferential direction is prevented. As a result, drag acts on the two end portions 9A in the circumferential direction of the top foil 9.

The top foil 9 approaches the insertion hole 12a of the bearing housing 12 in a wedge shape (inclined state being in the tangential direction of the top foil 9 rolled in a cylindrical shape) as it goes to two ends of the top foil 9 in the circumferential direction. That is, the separation between the inner peripheral surface of the top foil 9 and the center line of the insertion hole 12a increases toward each of the two ends thereof in the circumferential direction. In other words, the separation between the top foil 9 and the inner peripheral surface of the insertion hole 12a gradually decreases toward each of the two ends in the circumferential direction of the top foil 9. Similarly, the top foil 9 approaches the intermediate foil 10 in a wedge shape as it goes to each the two ends thereof in the circumferential direction. In other words, the separation between the top foil 9 and the intermediate foil 10 gradually decreases toward each of the two ends in the circumferential direction of the top foil 9. In addition, the protruding parts 21a and 21b engage in the second engagement grooves 20, whereby the movement of the top foil 9 in the axial direction is prevented.

In this embodiment, the first uneven portion 23a and the second uneven portion 23b described above are provided in the top foil 9, but the present disclosure is not limited to this configuration. Two ends in the circumferential direction of the top foil may be provided with a first uneven portion and a second uneven portion, the first uneven portion may include at least one protruding part and at least one recessed part, the second uneven portion may include at least one protruding part and at least one recessed part, and in a state where the top foil is rolled in a cylindrical shape such that the first uneven portion and the second uneven portion overlap each other, the protruding part of the first uneven portion may pass through the recessed part of the second uneven portion, and the protruding part of the second uneven portion may pass through the recessed part of the first uneven portion. In this case, the structures of the through groove 13 and the engagement member 16 may be appropriately changed according to the numbers of the protruding parts and the recessed parts provided in the first uneven portion and the second uneven portion. Further, the numbers of the protruding parts and the recessed parts provided in the first uneven portion and the second uneven portion may be greater than the numbers in this embodiment. For example, the first uneven portion may include two protruding parts and three recessed parts, and the second uneven portion may include three protruding parts and two recessed parts.

The two recesses 15 are provided in the through groove 13 of this embodiment, but the present disclosure is not limited to this configuration, and other configurations may be used. For example, instead of the recesses 15, protrusions for locking two ends in the circumferential direction of the top foil may be provided at the opening end of the through groove 13.

Returning to the part (b) of FIG. 6, the top foil 9 is provided with thin portions 24 at a side (one short side) on which the first uneven portion 23a is provided and another side (the other short side) on which the second uneven portion 23b is provided, and the thin portions 24 are thinner (have thinner thickness) than the central portion between the sides. As shown in FIG. 2, the thin portions 24 are formed to be thin such that the outer peripheral surfaces thereof (the surfaces on the bearing housing 12-side) are depressed relative to the outer peripheral surface of the central portion. That is, the outer peripheral surface of the top foil 9 is provided with steps from the central portion toward the inner peripheral side, at two ends thereof.

As shown in FIG. 2, the length L in the circumferential direction of the thin portion 24 is a length corresponding to the sum of the through groove 13 and one hill part 11c at the end portion of the back foil 11. In the present disclosure, the top foil 9 disposed in the bearing housing 12 includes steps from the thin portions 24 toward the outer peripheral side and becomes thin via the steps. The thin portions 24 extend to positions in the circumferential direction beyond the hill parts 11c closest to the two ends in the circumferential direction of the top foil 9.

Returning to FIG. 3, the cover 50 is attached to each of both end surfaces 12b in the axial direction of the bearing housing 12. The cover 50 faces, in the axial direction, the engagement member 16 that engages with the two end portions 9A of the top foil 9. The cover 50 of the present disclosure covers at least part of an open end 13A of the through groove 13 formed on the end surface 12b in the axial direction of the bearing housing 12. That is, in the present disclosure, when viewed in the axial direction, the inner peripheral side of the through groove 13 is exposed from the inner peripheral edge of the cover 50. Specifically, the cover 50 covers part of the through groove 13 that is on outside in the radial direction of the recess 15. Thereby, the cover 50 faces, in the axial direction, the base 17 of the engagement member 16 shown in FIGS. 7 and 8A. In other words, the cover 50 is disposed so as to overlap, in the axial direction, at least part of the base 17. That is, it is sufficient that the cover 50 faces at least part of the engagement member 16 in the axial direction.

The cover 50 of the present disclosure is formed in a circular annular plate shape in the circumferential direction of the bearing housing 12. The diameter of the inner peripheral edge of the cover 50 is greater than the diameter of the inner peripheral edge of the bearing housing 12, and the diameter of the outer peripheral edge of the cover 50 is less than the diameter of the outer peripheral edge of the bearing housing 12. The cover 50 covers at least part of the first engagement groove 25 that accommodates the engagement pin 30. In other words, the cover 50 of the present disclosure faces (overlaps) the engagement part 31 of the engagement pin 30 in the axial direction. That is, it is sufficient that the cover 50 faces at least part of the engagement part 31 of the engagement pin 30 in the axial direction.

The cover 50 is fixed by screws 51 screwed into screw holes 52 (see FIG. 2) formed in the bearing housing 12 in the vicinities of the first engagement grooves 25. The cover 50 of the present disclosure is screwed at positions that divide the end surface 12b of the bearing housing 12 into substantially three in the circumferential direction. According to the above configuration, the engagement member 16 can be prevented from coming out of the open end 13A of the through groove 13 in the axial direction. In addition, according to the above configuration, the engagement pin 30 can be prevented from detaching from the first engagement groove 25 in the axial direction.

Next, the operation of the radial foil bearing 3 having the above configuration will be described.

In a state where the rotary shaft 1 stops, the top foil 9 is pushed onto the rotary shaft 1 via the intermediate foil 10 (three intermediate foil pieces 10a) by the back foil 11 (three back foil pieces 11a) and thus closely contacts the rotary shaft 1. Note that in the present disclosure, since two end portions of the top foil 9 have the thin portions 24, at the thin portions 24, a force (local preload) for clamping the rotary shaft 1 is moderated compared to a case without the thin portions 24.

Then, when the rotary shaft 1 is started in the direction of the arrow P in FIG. 2, the rotary shaft 1 starts rotating at a low speed at first and then gradually accelerates to rotate at a high speed. Then, as shown by the arrow Q in FIGS. 2 and 3, an ambient fluid is drawn from one end side of each of the top foil 9, the intermediate foil 10 and the back foil 11 and flows into a space between the top foil 9 and the rotary shaft 1. Thereby, a fluid lubricating film is formed between the top foil 9 and the rotary shaft 1.

The film pressure of the fluid lubricating film acts on the top foil 9 and presses each hill part 11c of the back foil piece 11a via the intermediate foil 10 contacting the top foil 9. Then, when the back foil piece 11a is pressed by the intermediate foil 10, the hill part 11c is pressed and expanded, and thereby the back foil piece 11a starts moving on the bearing housing 12 in the circumferential direction. That is, since the back foil piece 11a (the back foil 11) elastically supports the top foil 9 via the intermediate foil 10, the back foil piece 11a deforms in the circumferential direction when receiving a load from the top foil 9 and thereby allows the flexure of the top foil 9 or the intermediate foil 10 and supports them.

Here, as shown in the part (b) of FIG. 5, the engagement pin 30 is inserted through the notch 26 formed at an edge of the end in the axial direction of the back foil piece 11a and through the notch 27 formed at an edge of the end in the axial direction of the intermediate foil piece 10a. The engagement pin 30 engages in the first engagement groove 25 of the bearing housing 12, and when the engagement pin 30 is inserted through the notch 26 and the notch 27, the rotation of the back foil piece 11a and the intermediate foil piece 10a in the circumferential direction is prevented.

The engagement pin 30 contacts the back foil piece 11a and the intermediate foil piece 10a and also prevents the movement of the back foil piece 11a and the intermediate foil piece 10a in the axial direction. Further, the return part 33 (see FIG. 4) is provided in the engagement pin 30 on the front side of the intermediate foil piece 10a (the back foil piece 11a) having passed through the notch 26 and the notch 27 and serves as a retainer for the back foil piece 11a and the intermediate foil piece 10a in the radial direction. Therefore, the back foil piece 11a and the intermediate foil piece 10a are prevented from detaching from the bearing housing 12.

When the fluid lubrication film is formed between the top foil 9 and the rotary shaft 1, the rotary shaft 1 and the top foil are brought into a non-contact state. In the transition period up to the non-contact state, solid friction occurs between the rotary shaft 1 and the top foil 9. At this time, a coating applied to the surface of the top foil 9 moderates wear between the rotary shaft 1 and the top foil 9. When the solid friction occurs between the rotary shaft 1 and the top foil 9 in this way, the top foil 9 tends to rotate together with the rotary shaft 1 in the circumferential direction. However, since two ends of the top foil 9 are inserted into the recesses 15 of the through groove 13, the top foil 9 does not start rotating in the circumferential direction.

The movement of the top foil 9 in the axial direction is prevented by the cover 50 attached to the end surface 12b of the bearing housing 12. The cover 50 faces, in the axial direction, the engagement member 16 that engages with the top foil 9. Therefore, even if the engagement member 16 tries to move in the axial direction, the engagement member 16 is caught by the inner peripheral edge (or the inner surface in the axial direction) of the cover 50, and thus the top foil 9 is prevented from dropping off in the axial direction. That is, the top foil 9 of the present disclosure is disposed to overlap the partition part 19 of the engagement member 16 in the axial direction. Further, since the rotary shaft 1 is inserted into the top foil 9 rolled in a cylindrical shape, the top foil 9 does also not detach in the radial direction. Therefore, the top foil 9 is prevented from detaching from the bearing housing 12.

In this way, according to the present disclosure described above, a configuration is adopted including the bearing housing 12 provided with the insertion hole 12a, the top foil 9 accommodated in the insertion hole 12a, and the cover 50 attached to the end surface 12b of the bearing housing 12 in the axial direction in which the insertion hole 12a extends, in which the top foil 9 is rolled in a cylindrical shape in a state where two ends of the top foil 9 intersect such that the two ends of the top foil 9 are pulled out toward the bearing housing 12, and in which the cover 50 faces, in the axial direction, the engagement member 16 attached to the bearing housing 12 and engaging with the top foil 9, whereby the top foil 9 can be prevented from detaching from the bearing housing 12.

Further, as shown in FIG. 7, the bearing housing 12 is provided with the through groove 13 extending in the axial direction. Then, in a state where the top foil 9 is rolled in a cylindrical shape and two end portions 9A thereof engage in the second engagement grooves 20 of the engagement member 16, the top foil 9 is inserted in the axial direction along the through groove 13. The engagement member 16 includes no pair of legs for engaging with the bearing housing 12, unlike the engagement member of the above-described related art (Japanese Unexamined Patent Application, First Publication No. 2013-217425). Therefore, the engagement member 16 can be inserted straight into the through groove 13 in the extending direction thereof in a state of engaging with the top foil 9.

According to the above configuration, at the time the bearing is assembled, it is not needed to attach the engagement member 16 to the bearing housing 12 prior to insertion of the top foil 9 as in the related art. Therefore, for example, it is not needed to insert the top foil 9 into the bearing housing 12 in the axial direction in a state where the top foil 9 is rolled into a conical shape and where further is rolled to be smaller than the inner diameter of the insertion hole 12a. Therefore, the work of attaching the top foil 9 does not need an operator's skill, and the assembly time is decreased, resulting in a reduction in assembly cost. In addition, since the coating of the top foil 9 can be prevented from being scratched due to two ends of the top foil 9 rubbing against each other at the time the top foil 9 is attached, the bearing life can be prevented from decreasing due to the wear progressing from the scratches.

Further, since the engagement member 16 is allowed to be inserted straight into the through groove 13, as shown in FIG. 8A, the shape of the through groove 13 can be simplified. That is, the corner 13c of the through groove 13 has a curved surface that smoothly connects the side surface 13a and the bottom surface 13b. This curved surface corresponds to the round of the tool for cutting out the through groove 13. In the related art, the corner 13c is cut to be deeper than the bottom surface 13b in order to limit the engagement member 16 from lifting up due to the curved surface. However, when the engagement member 16 is made straight as in the present disclosure, the fillet 17a is more easily formed as compared to an engagement member provided with legs as in the above-described related art (Japanese Unexamined Patent Application, First Publication No. 2013-217425). Therefore, it is not needed to cut the corner 13c deeply, and the working cost of the through groove 13 can be reduced.

Figure 9:
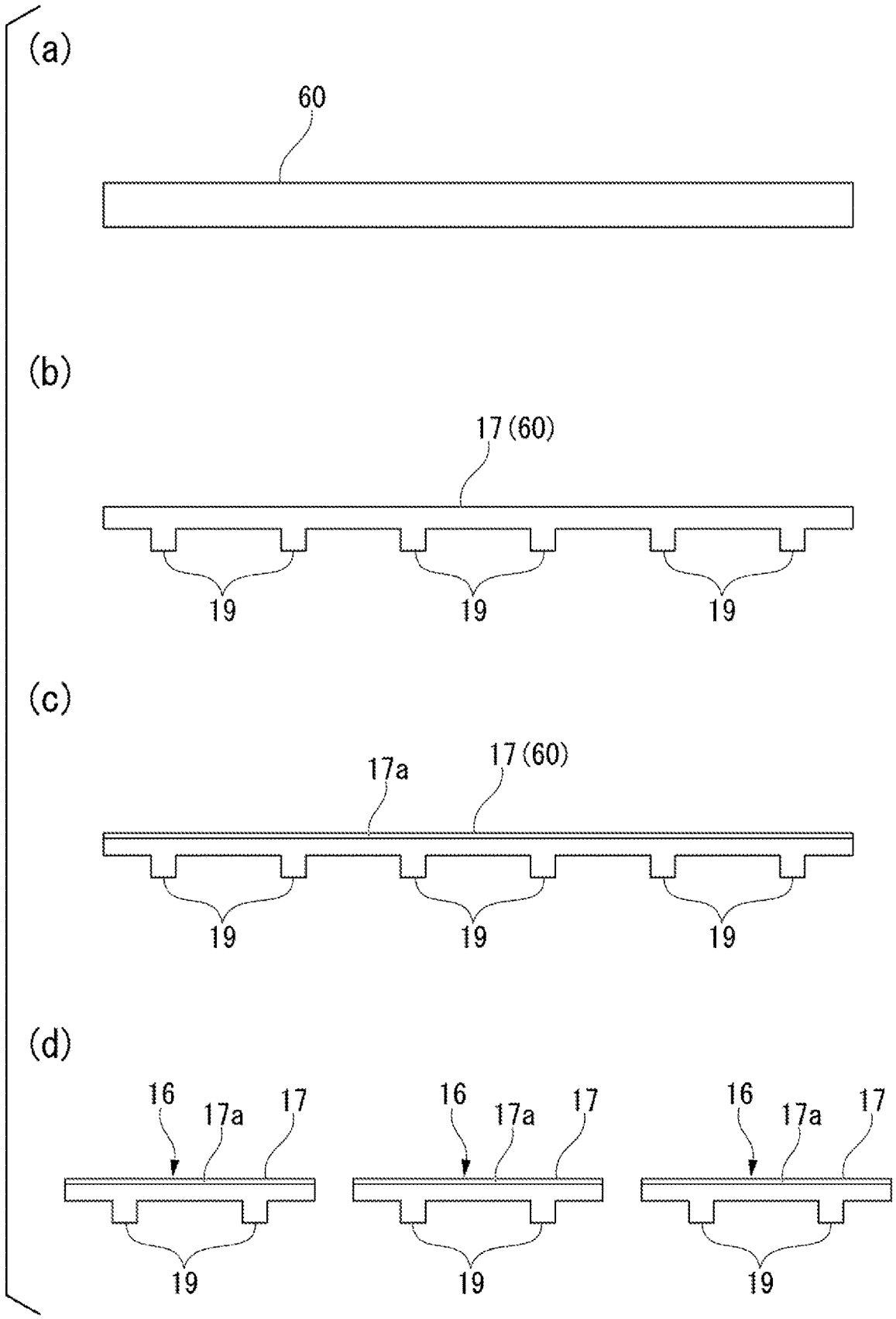
FIG. 9 is a diagram showing a manufacturing process for an engagement member of the present disclosure.

FIG. 9 is a diagram showing a manufacturing process for the engagement member 16 of the present disclosure.

The engagement member 16 can be manufactured through, for example, steps shown in the parts (a) to (d) of FIG. 9. First, as shown in the part (a) of FIG. 9, a long-shaped plate 60 for forming the engagement member 16 by cutting is prepared. Next, as shown in the part (b) of FIG. 9, a plurality of partition parts 19 are cut out from the plate 60. Next, as shown in the part (c) of FIG. 9, the fillet 17a is formed on the opposite side of the base 17 from the partition parts 19 on the entire length in the longitudinal direction of the base 17. Finally, the engagement member 16 can be manufactured by dividing the base 17 in the longitudinal direction such that the engagement member 16 includes two partition parts 19. In this way, the fillet 17a can be easily formed because no legs as in the above-described related art (Japanese Unexamined Patent Application, First Publication No. 2013-217425) protrude in the opposite direction to the protruding direction of the partition parts 19. Therefore, the manufacturing cost of the engagement member 16 can also be reduced.

Hereinbefore, although one embodiment of the present disclosure has been described with reference to the drawings, the present disclosure is not limited to the above embodiment. The shapes, combinations and the like of the components described in the above embodiment are merely examples, and various modifications of the configuration can be adopted based on design requirements and the like within the scope of the present disclosure.

For example, the present disclosure may adopt modifications shown in FIGS. 10 to 13. In the following description, the same or equal component as or to that of the above embodiment is attached with an equal reference sign, and the explanation thereof will be simplified or omitted.

Figure 10:
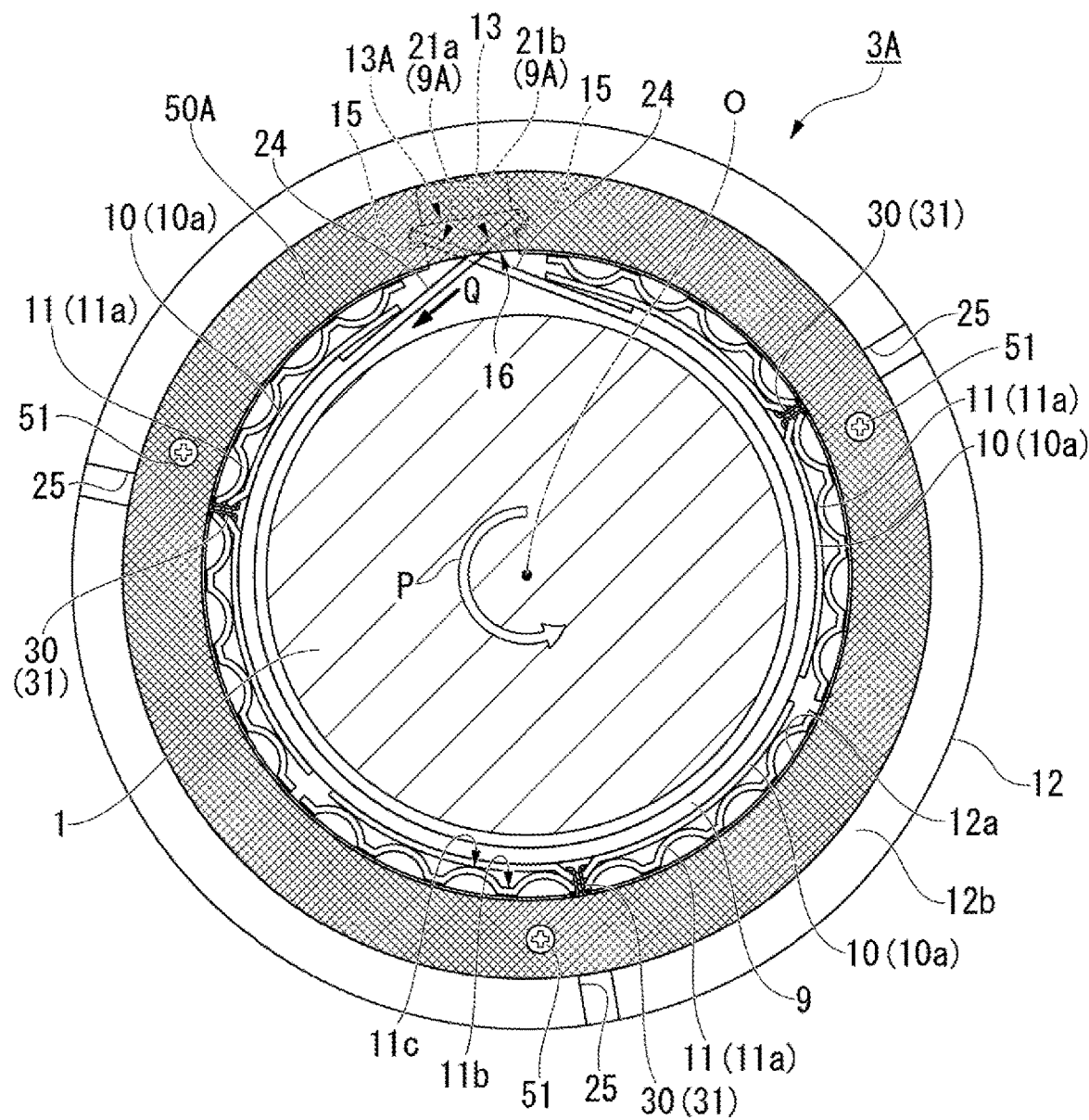
FIG. 10 is a front view showing a radial foil bearing of a modification of the present disclosure.

FIG. 10 is a front view showing a radial foil bearing 3A of a modification of the present disclosure.

A cover 50A shown in FIG. 10 faces, in the axial direction, two ends of the top foil 9 and the engagement member 16 engaging with the two ends of the top foil 9. That is, the inner diameter of the cover 50A is approximately the same as the inner diameter of the bearing housing 12. The cover 50A covers substantially the entire area of the open end 13A of the through groove 13 formed on the end surface 12b of the bearing housing 12. According to this configuration, since not only the engagement member 16 but also two ends of the top foil 9 are caught by the inner edge of the cover 50A, the movement of the top foil 9 in the axial direction is more reliably prevented.

Note that in the arrangement of the cover 50A shown in FIG. 10, the engagement member 16 may not be provided. That is, even if the engagement member 16 is not provided, when two ends of the top foil 9 are caught by the inner edge of the cover 50A, the top foil 9 can be prevented from detaching from the bearing housing 12.

That is, in the above embodiment and modification, the covers 50 and 50A face the engagement member 16 in the axial direction, but the present disclosure is not limited thereto. Regardless of the presence or absence of the engagement member, the cover may be configured to face two ends of the top foil 9 in the axial direction and may not to face the engagement member in the axial direction.

Figure 11:
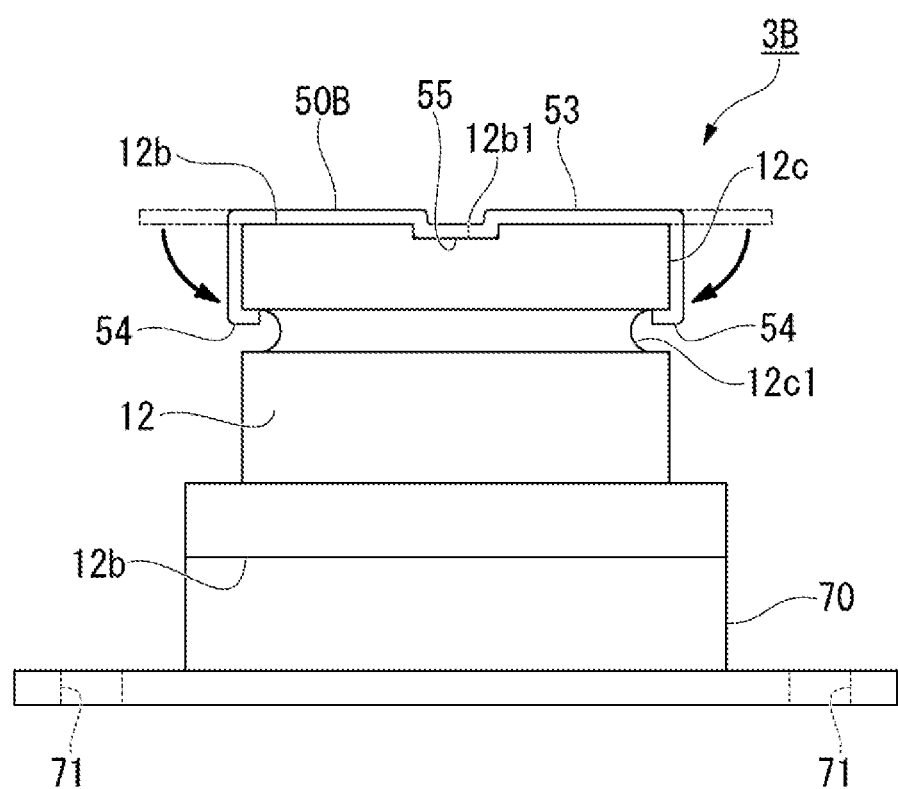
FIG. 11 is a bottom view showing a radial foil bearing of a modification of the present disclosure.
Figure 12:
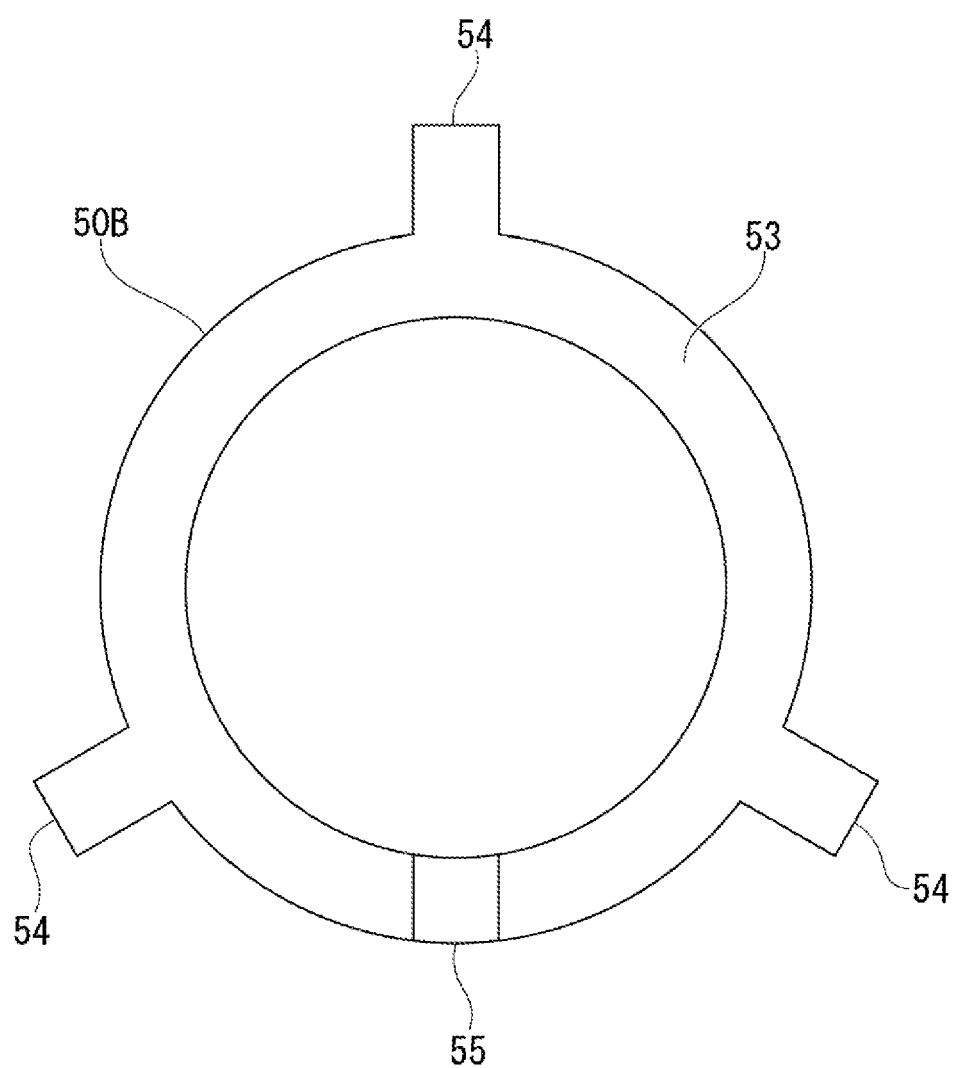
FIG. 12 is a front view showing a cover before being attached to a bearing housing shown in FIG. 11.

FIG. 11 is a bottom view showing a radial foil bearing 3B of a modification of the present disclosure. FIG. 12 is a front view showing a cover 50B before being attached to the bearing housing 12 shown in FIG. 11.

The cover 50B shown in FIG. 11 is attached to the bearing housing 12 by caulking. Specifically, the cover 50B includes an annular portion 53 (see FIG. 12) facing the end surface 12b of the bearing housing 12, and caulking parts 54 extending from the outer edge of the annular portion 53 and facing an outer peripheral surface 12c of the bearing housing 12 in the radial direction of the insertion hole 12a. In other words, the caulking parts 54 extend from the outer edge of the annular portion 53 and faces the outer peripheral surface 12c positioned on the outer side of the bearing housing 12 in the radial direction of the insertion hole 12a.

As shown in FIG. 12, a plurality (preferably, three or more) of caulking parts 54 are formed on the outer edge of the annular portion 53 at intervals in the circumferential direction. As shown in FIG. 11, the caulking part 54 extends in the axial direction along the outer peripheral surface 12c of the bearing housing 12 and is bent toward the inner peripheral side (inward in the radial direction). An annular groove 12c1 extending in the circumferential direction is formed on the outer peripheral surface 12c of the bearing housing 12, and the distal end of the caulking part 54 is inserted into the annular groove 12c1. Further, a positioning groove 12b1 for the cover 50B is formed on the end surface 12b of the bearing housing 12. That is, the end surface 12b in the axial direction of the bearing housing 12 facing the cover 50B includes a step in the axial direction. On the other hand, an insertion part 55 inserted into the positioning groove 12b1 is provided in the annular portion 53 of the cover 50B. The insertion part 55 is a protrusion (recess) in which a portion of the cover 50B is protruded (depressed) by press working, is inserted and fitted into the positioning groove 12b1, and prevents the rotation of the cover 50B in the circumferential direction.

According to this configuration, the cover 50B can be attached to the bearing housing 12 by caulking without using a plurality of screws 51. Therefore, the working period of time for attaching the cover 50 is decreased, and as a result, the manufacturing cost is reduced.

In addition, as shown in FIG. 12, an attachment flange 70 is connected to the end surface 12b of the bearing housing 12 to which the cover 50B is not attached. The attachment flange 70 is provided with a plurality of attachment holes 71 for attaching the radial foil bearing 3B to an installation target (not shown). The attachment flange 70 faces, in the axial direction, at least either one of two ends of the top foil 9 and the engagement member 16 engaging with the two ends of the top foil 9. That is, in this configuration, the cover 50B is attached to only one end surface 12b of the bearing housing 12.

Figure 13:
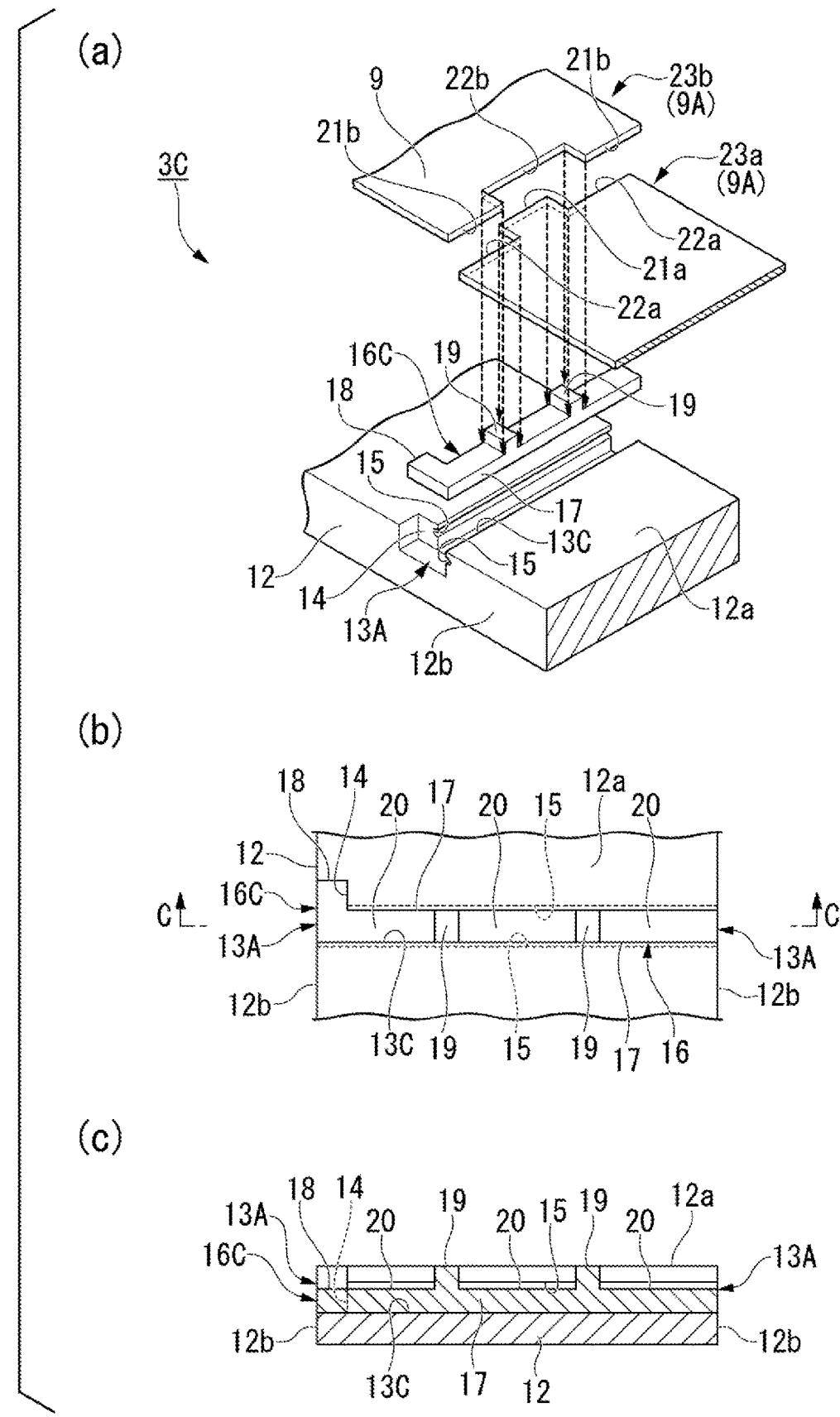
FIG. 13 is a schematic view of the main part of a through groove of a radial foil bearing of a modification of the present disclosure, the part (a) thereof is an exploded perspective view, the part (b) thereof is a plan view, and the part (c) thereof is a cross-sectional view taken along line C-C.

FIG. 13 is a schematic view of the main part of a through groove 13C of a radial foil bearing 3C of a modification of the present disclosure, the part (a) thereof is an exploded perspective view, the part (b) thereof is a plan view, and the part (c) thereof is a cross-sectional view taken along line C-C.

An engagement member 16C shown in FIG. 13 is formed in an L-shape in plan view (when viewed in the radial direction) and includes a protrusion 18 protruding in the circumferential direction from one side surface of one end portion in the axial direction of the base 17. Further, the through groove 13C is provided with a receiving groove 14 that has an L-shape in plan view (when viewed in the radial direction) and in which the protrusion 18 is accommodated. According to this configuration, at the one end portion in the axial direction, the protrusion 18 of the engagement member 16C and the receiving groove 14 of the through groove 13C engage with each other. Therefore, it is sufficient to attach the cover 50 to only one end surface 12b of the bearing housing 12, where the receiving groove 14 is provided on the one end surface 12b-side of the bearing housing 12.

In addition, the base 17 is tapered in the longitudinal direction thereof without providing the protrusion 18 in the engagement member 16C. Further, the through groove 13C is tapered in the axial direction without providing the receiving groove 14 in the through groove 13C. Thereby, the engagement member 16C engages with the through groove 13C in a wedge shape. Even in this case, it is sufficient to attach the cover 50 to only one end surface 12b of the bearing housing 12, where the wedge shape is loosened on the one end surface 12b-side of the bearing housing 12 (the width in the circumferential direction of the wedge shape on the one end surface 12b-side of the bearing housing 12 is greater than that on the other side).

As another modification, for example, if the engagement pin 30 is not used to attach the back foil 11 and the intermediate foil 10, the cover 50 may not be in a circular annular shape. That is, the cover 50 may be a rectangular or arcuate plate that covers at least part of the open end 13A of the through groove 13.

In the present disclosure, the configuration including the intermediate foil 10 is exemplified, but a configuration without the intermediate foil 10 may be adopted.

INDUSTRIAL APPLICABILITY

The present disclosure can be applied to a radial foil bearing that encircles and supports a rotary shaft.

What is claimed is:
1. A radial foil bearing, comprising:
a bearing housing provided with an insertion hole;

a top foil accommodated in the insertion hole;

an engagement member attached to the bearing housing and engaging with the top foil; and a cover attached to an end surface of the bearing housing in an axial direction in which the insertion hole extends, wherein the top foil is rolled in a cylindrical shape in a state where two ends of the top foil intersect such that the two ends of the top foil further extend outward in a radial direction of the insertion hole than an inner peripheral surface of the bearing housing, the cover faces, in the axial direction, the two ends of the top foil, and the cover is attached to the bearing housing by caulking.

2. The radial foil bearing according to claim 1, wherein the insertion hole is provided with a through groove extending from the end surface of the bearing housing in the axial direction, the two ends of the top foil are accommodated in the through groove, and the cover covers at least part of an open end of the through groove formed on the end surface of the bearing housing.

3. The radial foil bearing according to claim 2, wherein a surface of the engagement member facing a bottom surface of the through groove is flat.

4. The radial foil bearing according to claim 2, wherein the engagement member has a chamfer or fillet facing a corner between a side surface and a bottom surface of the through groove.

5. The radial foil bearing according to claim 4, wherein the corner of the through groove has a curved surface that smoothly connects the side surface and the bottom surface.

6. The radial foil bearing according to claim 1, wherein the cover includes an annular portion facing the end surface of the bearing housing, and a caulking part extending from an outer edge of the annular portion and facing an outer peripheral surface of the bearing housing positioned on outside in the radial direction of the insertion hole.

7. A radial foil bearing, comprising:

a bearing housing provided with an insertion hole;

a top foil accommodated in the insertion hole;

an engagement member attached to the bearing housing and engaging with the top foil; and a cover attached to an end surface of the bearing housing in an axial direction in which the insertion hole extends;

wherein the top foil is rolled in a cylindrical shape in a state where two ends of the top foil intersect, the cover faces, in the axial direction, the engagement member, the insertion hole is provided with a through groove extending from the end surface of the bearing housing in the axial direction, the two ends of the top foil are accommodated in the through groove, the cover covers at least part of an open end of the through groove formed on the end surface of the bearing housing, the engagement member is accommodated in the through groove, and the engagement member has a chamfer or fillet facing a corner between a side surface and a bottom surface of the through groove.

8. The radial foil bearing according to claim 7, wherein a surface of the engagement member facing the bottom surface of the through groove is flat.

9. The radial foil bearing according to claim 7, wherein the corner of the through groove has a curved surface that smoothly connects the side surface and the bottom surface.

10. The radial foil bearing according to claim 7, wherein the cover faces, in the axial direction, the two ends of the top foil in addition to the engagement member.

* * * * *